United States Patent [19]
Plake

[11] 3,761,812
[45] Sept. 25, 1973

[54] METHOD AND APPARATUS FOR DETECTING ANOMALIES IN A METER MOVEMENT

[75] Inventor: William C. Plake, Santa Barbara, Calif.

[73] Assignee: EG & G, Inc., Bedford, Mass.

[22] Filed: June 12, 1972

[21] Appl. No.: 262,169

[52] U.S. Cl. ................................. 324/74, 324/57 R
[51] Int. Cl. ......................... G01r 3/00, G01r 35/00
[58] Field of Search ................ 73/1 R; 324/74, 57 R

[56] References Cited
UNITED STATES PATENTS
2,618,686   3/1948   DeLange ........................ 324/57 R FOREIGN PATENTS OR APPLICATIONS
2,515,969   11/1965   Japan .................................... 324/74

Primary Examiner—Rudolph V. Rolinec
Assistant Examiner—Rolf Hille
Attorney—Ralph L. Cadwallader et al.

[57] ABSTRACT

Method for detecting anomalies in the motion of the moving systems of electrical meters and similar devices including the steps of applying a ramp current to the meter movement to develop a ramp voltage across it and detecting perturbations in the ramp voltage. Embodiments of apparatus for practicing the method are also disclosed.

7 Claims, 11 Drawing Figures

METHOD AND APPARATUS FOR DETECTING ANOMALIES IN A METER MOVEMENT

The present invention relates to electrical meters and in particular to methods and apparatus for determining whether the motion of the moving systems of electrical meters, such as, for example, D'Arsonval type meters, is faulty or not.

Some of the conditions that interfere with the normal turning of the moving system of an electrical meter are a warped or loosened scale, fibers extending upward from a paper scale, iron filings or other obstructions in the air gap, a bent pointer or damping vane, a flat pivot or broken jewel, a moving system that is too tight or too loose in its bearings. All such conditions are hereinafter referred to as "anomalies" in the moving system.

The prior art teaches that some of these anomalies can be detected by observing the "jumping" of the pointer as the operating current of the meter is very slowly increased or decreased to produce a gradual change in deflection. Further, during such testing, if the meter is set to a scale mark and the meter is lightly tapped, a slight change in the position of the pointer reveals the presence of pivot friction. Such tests require highly skilled personnel who are able to properly interpret their observations.

Thus, calibration procedures for electrical meters do not normally include tests for determining the presence of anomalies. To the best of my knowledge and belief, suitable test equipment for doing so reliably and automatically has not heretofore been available. With the present invention I propose to fill that need.

Accordingly, it is an object of the present invention to provide methods, and apparatus that will serve to check the motion of moving systems of various types of electrical meters and instruments, as well as loudspeakers, accelerometers, etc., reliably and quickly and with much greater accuracy than with the techniques heretofore taught.

In accordance with another object of the invention, simple and reliable apparatus is provided for performing the desired methods with but a few simple steps which may be carried out under the control of non-skilled testing personnel.

The invention contemplates in its main aspect applying a ramp current to the meter movement thereby producing a ramp voltage across the terminals of the meter. In the absence of anomalies in the motion of the moving system of the meter there will be no perturbations in the ramp voltage. However, if anomalies are present, perturbations in the ramp voltage will be created and these are detected by several methods hereinafter described in detail.

The invention, both as to its organization and method of operation together with further objects and advantages thereof will best be understood by reference to the following description taken in connection with the accompanying drawings, in which.

Figure 1:
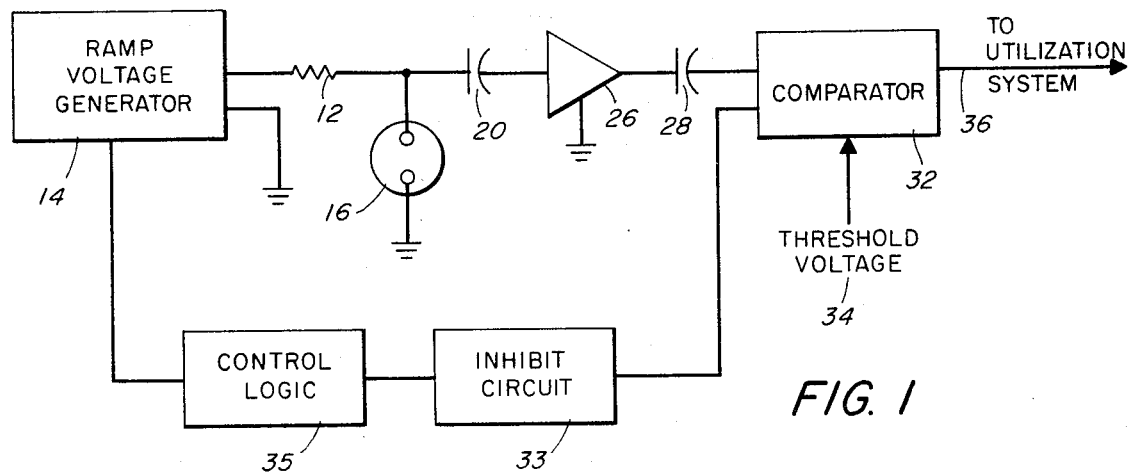
FIG. 1 illustrates schematically and partly in block diagram a preferred embodiment of the present invention.
Figure 2:
FIGS. 2, 3, 4A, 4B, 5A and 5B illustrate waveforms useful in explaining the operation of the embodiment of FIG. 1.
Figure 3:
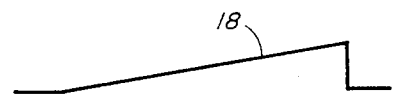
Figure 4A:
Figure 4B:
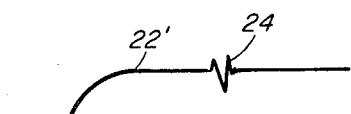
Figure 5A:
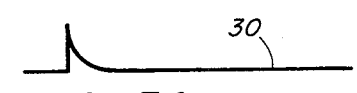
Figure 5B:
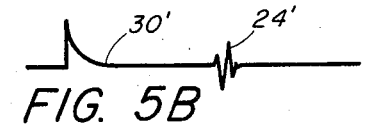

Referring to FIGS. 1 through 5B, ramp current 10 derived through resistor 12 from the ramp voltage, not shown, produced by generator 14 and applied to meter 16, produces an IR drop across the internal resistance of meter 16. Concurrently, ramp current 10 causes the moving element of meter 16 to rotate at a constant rate, in the absence of anomalies in its motion. This may be shown as follows:

$$I = k_1 t$$
$$\theta = k_2 I = k_1 k_2 t$$
$$d\theta/dt = k_1 k_2$$

where
$I$ = magnitude of current in current ramp;
$\theta$ = total angle through which the moving system rotates;
$t$ = time;
$d\theta/dt$ = angular velocity; and
$k_1$ and $k_2$ are constants.

The constant angular velocity of the coil in a constant magnetic field causes a constant CEMF to be induced in the coil of meter 16. If anomalies are present in the motion of the moving system, the angular velocity will not be constant and voltage perturbations will appear in the CEMF. The resultant voltage appears as voltage ramp 18 of FIG. 3 in which the IR drop is considerably larger than the CEMF, or any voltage perturbations occuring therein.

Capacitor 20 differentiates ramp voltage 18, producing voltage waveform 22 which has a constant magnitude in the absence of anomalies in the moving system. If anomalies are present, voltage perturbations 24 occur in voltage waveform 22'. The time duration of ramp current 10 may be made as long as desired. Reasonable times, for test purposes, are from 5 to 30 seconds. These time durations tend to assure that perturbations occurring in normal service will be detected.

Obviously, the perturbations in voltage waveform 22' may be observed on an oscilloscope or may be detected by other means. For employment in an utilization system the remainder of the embodiment of FIG. 1 may be employed. This comprises amplifier 26 to amplify waveform 22 and differentiating capacitor 28 to differentiate the amplified waveform 22, producing voltage waveform 30 which has a zero level in the absence of anomalies. Comparator 32 compares voltage 30 with a predetermined threshold voltage 34 and produces an output 36 whenever voltage perturbations 24' exceed threshold voltage 34. Voltage perturbations 24' occur in voltage waveform 30' in the presence of anomalies. Output 36 may be utilized by the utilization system in any manner desired. If desired, comparator 32 may be inhibited by inhibit circuit 33, which may be controlled automatically by control logic 35 during start-up and reversal of motion of the moving system of meter 16 to avoid false indications of anomalies.

Figure 6:
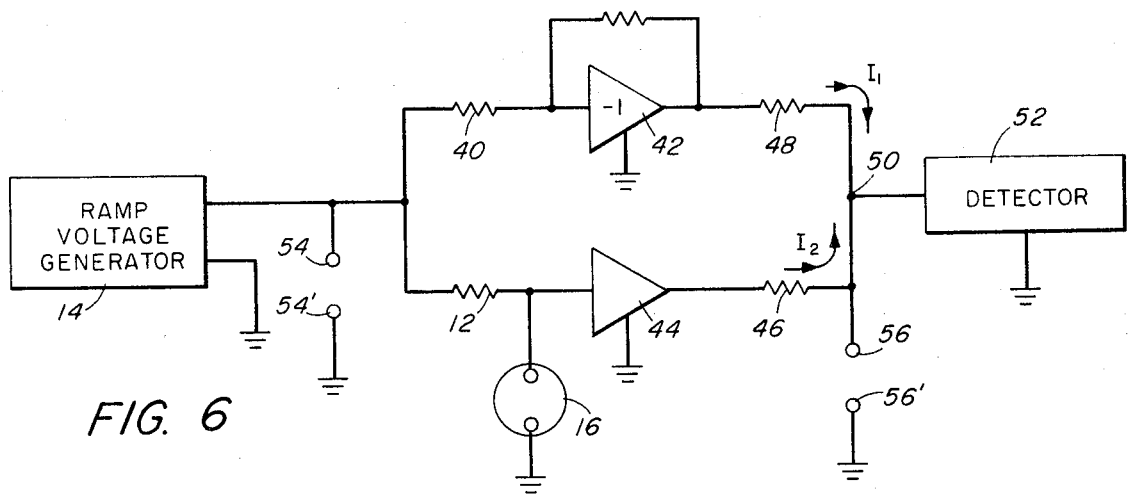
FIGS. 6 and 7 illustrate other embodiments of the present invention.

In the embodiment of FIG. 6, ramp current 10, derived through resistor 12 from the ramp voltage, not shown, produced by generator 14 and applied to meter 16, produces ramp voltage 18 across meter 16. The ramp voltage produced by generator 14 is also applied through resistor 40 to inverting amplifier 42, while ramp voltage 18 is applied to amplifier 44. The output voltages of amplifiers 42 and 44 are ramp voltages of opposite polarity. The moving system of meter 16 is then locked in position so no CEMF is produced. The gains of amplifiers 42 and 44 are so adjusted, and the values of resistors 46 and 48 are so selected, that the output ramp voltages are converted to ramp currents $I_1$ and $I_2$ of opposite polarity and equal absolute magnitudes. Ramp currents $I_1$ and $I_2$ then sum to zero at summing point 50.

The moving system of meter 16 is then unlocked. As before, the CEMF induced in the coil will be constant and have no perturbations in the absence of anomalies in the motion of the moving system. However, if anomalies are present, they will appear as perturbations in the CEMF and as current perturbations at summing point 50 which are detected by detector 52.

Detailed recordings may also be made of the input ramp voltage produced by generator 14 at terminals 54, 54' and of the CEMF present at summing point 50 at terminals 56, 56'. These recordings may have a number of different uses, such as production testing, non-linearity detecting, or test qualifications.

It will now be apparent to those skilled in the art that alternatively the output ramp voltages of amplifiers 42 and 44 of FIG. 6 can be adjusted to have equal absolute magnitudes when the moving system of meter 16 is locked, and that amplifier 42 need not be an inverting amplifier. Then, with the moving system unlocked, the output ramp voltages may be compared by a comparator set to trigger when voltage perturbations occur in the output ramp voltage of amplifier 44. Other variations can be made.

Figure 7:
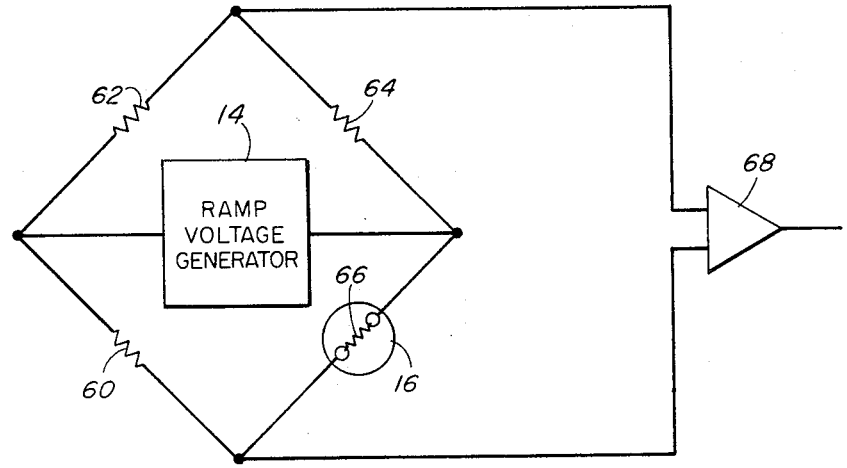

In the bridge embodiment of FIG. 7 generator 14 furnishes a ramp voltage to meter 16 through resistor 60 and to resistors 62 and 64. Resistors 60 and 62 have equal resistances and resistor 64 has a resistance equal to the resistance 66 of meter 16 when the moving system is locked. With the moving system unlocked, output signals from the bridge feed to differential amplifier 68 as shown. As will be obvious to those skilled in the art of electrical measurements, other more complex and highly sophisticated bridge circuits may utilize the basic method of the present invention.

Figure 8:
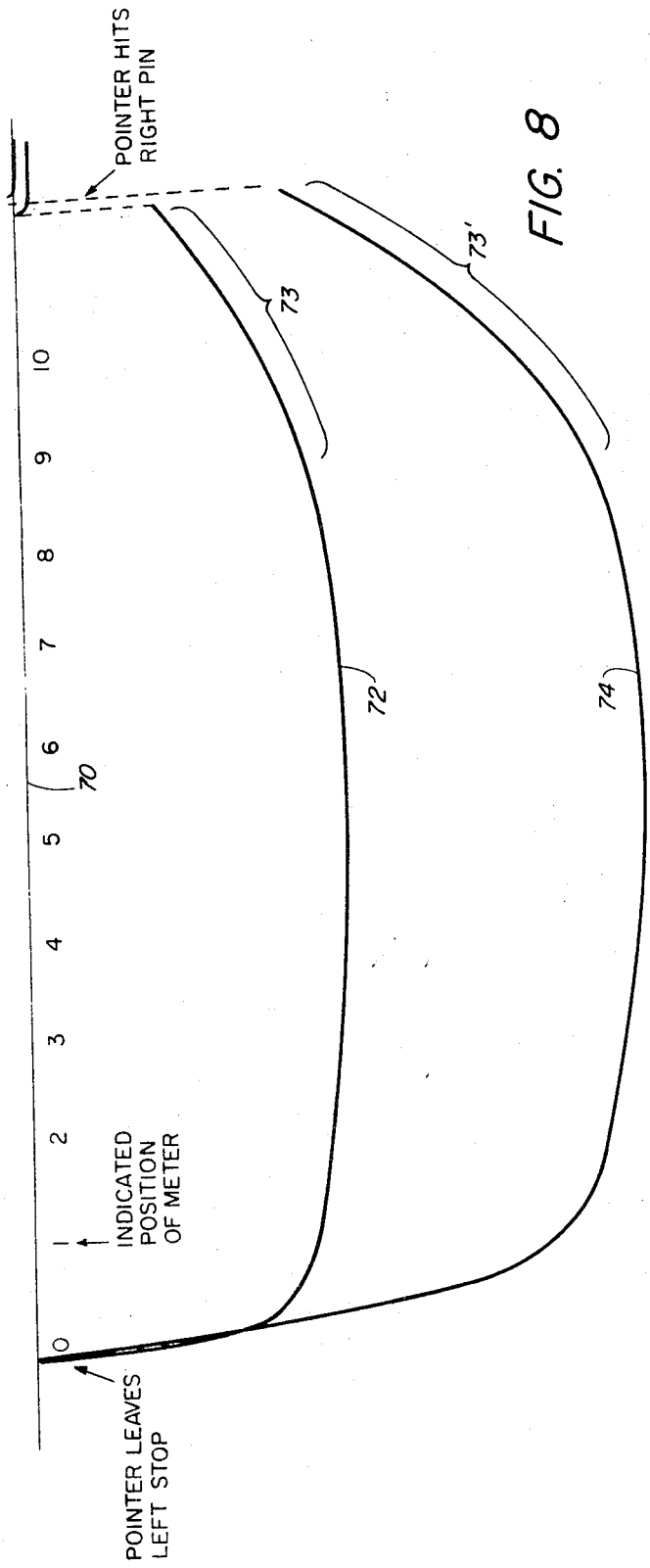
FIGS. 8 and 9 illustrate results obtained in testing several meters with the embodiment of FIG. 6.

A Simpson Multimeter Model 260 was tested in the embodiment of FIG. 6 and the outputs at terminals 54, 54' and 56, 56' were applied to an x-y recorder to produce curves 70, 72, and 74 of FIG. 8. First, a ramp current was applied to the meter with its rotor locked producing the nearly straight line of curve 70. Curves 72 and 74 were produced with the rotor unlocked and with ramp currents having time durations of 30 seconds and 11 seconds respectively. Note that curves 72 and 74 represent the CEMF's produced in the coil of the meter and that the curves are relatively flat except when the pointer leaves the left stop and during portions 73 and 73' respectively. These latter portions of the curves clearly show the non-linearity of the meter when the pointer is at the upper end of the scale. Note also that hardly any voltage perturbations occur in these curves indicating that the motion of the moving system was not subject to anomalies.

Figure 9:
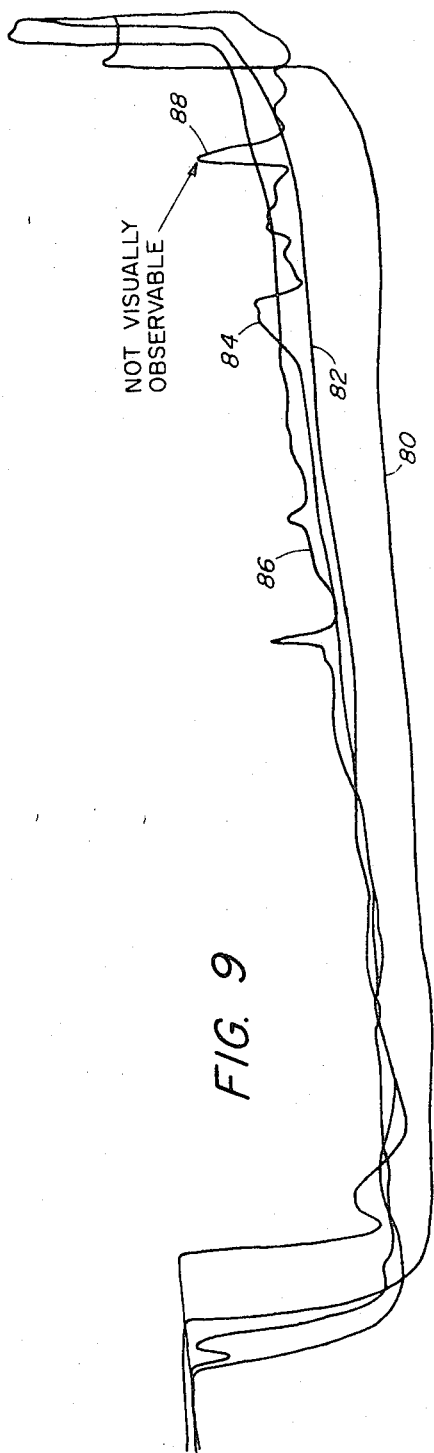

FIG. 9 illustrates curves 80, 82, 84 and 86 produced by the embodiment of FIG. 6 in the same manner in testing four different Tripplet VOM's. Note, for example, that curve 84 has perturbation 88 which was not visually observable when the ramp current was applied. Obviously, the meters that produced curves 84 and 86 have anomalies in the motions of their moving systems.

Obviously, many modifications and variations of the present invention are possible in the light of the above teachings. It is therefore to be understood that within the scope of the appendent claims, the invention may be practiced otherwise than as specifically described.

I claim:

1. A method of detecting anomalies in the motion of the moving system of an electrical meter or similar device, comprising:
   applying a ramp current to the device to produce a ramp voltage across it; and
   differentiating the ramp voltage to produce a DC voltage having a constant magnitude in the absence of anomalies in said motion and a DC voltage having perturbations in the presence of anomalies in said motion.

2. The method as in claim 1 further comprising the steps of:
   amplifying the differentiated ramp voltage; and
   differentiating the amplified differentiated ramp voltage to produce an output voltage having a zero level in the absence of anomalies and having perturbations in the presence of anomalies in said motion.

3. A method of detecting anomalies in the motion of the moving system of an electrical meter or similar device, comprising:
   inserting the device as one arm of a Wheatstone bridge, the other arms being resistors;
   applying a ramp voltage to the bridge; and
   adjusting the values of the resistance arms to produce a null balance when the meter movement is locked, output voltage perturbations being then produced when the meter movement is unlocked and during the presence of anomalies in said motion.

4. Apparatus for detecting anomalies in the motion of the moving system of an electrical meter of similar device, comprising:
   circuit means for generating and applying a ramp current to the device to produce a ramp voltage across the device; and
   means connected across the device for detecting perturbations in the ramp voltage comprising a differentiating circuit connected across the device to differentiate the ramp voltage producing a DC voltage of constant magnitude in the absence of anomalies in said motion and a DC voltage having perturbations in the presence of anomalies in said motion.

5. Apparatus as in claim 4 in which said detecting means further includes:
   an amplifier connected to the differentiating circuit for amplifying the DC voltage; and
   another differentiating circuit connected to the amplifier for differentiating the amplified DC voltage to produce an output voltage having a zero level in the absence of anomalies and perturbations in the presence of anomalies in said motion.

6. Apparatus for detecting anomalies in the motion of the moving system of an electrical meter or similar device, comprising:
   circuit means including a circuit for generating a ramp voltage and for applying it across a first resistor and the device connected in series at a first node;
   means for applying the ramp voltage across second and third resistors connected in series at a second node, the second resistor having a resistance equal in value to the resistance of the first resistor and the third resistor having a resistance equal in value to the resistance of the device when the moving system is locked in position; and means connected to detect perturbations in the voltage between the first and second nodes when the moving system is unlocked.

7. Apparatus as in claim 6 in which the perturbation detecting means comprises a differential amplifier connected between the first and second nodes.

* * * * *